United States Patent
Helgesson et al.

[11] 3,883,337
[45] May 13, 1975

[54] METHOD OF MANUFACTURING A GLASS OBJECT BY MOLDING AND SINTERING GLASS POWDER

[75] Inventors: Claes Ivar Helgesson, Akersberga; Sven Borje Stellan Persson, Taby; Hans-Olof Ingvar Nilsson, Goteborg, all of Sweden

[73] Assignee: Stig Arbman AB, Stockholm, Sweden

[22] Filed: Apr. 18, 1973

[21] Appl. No.: 352,333

[30] Foreign Application Priority Data
Feb. 6, 1973  Sweden ............................ 7301621-4

[52] U.S. Cl. .................. 65/31; 65/18; 65/33; 117/124 A
[51] Int. Cl. ............................................ C03c 15/00
[58] Field of Search ............... 65/31, 18, 144, 33; 106/45, 46, 73.5, 52; 117/124 A

[56] References Cited
UNITED STATES PATENTS

| | | | |
|---|---|---|---|
| 2,355,746 | 8/1944 | Nordberg et al. | 65/31 |
| 2,776,899 | 1/1957 | Donahey | 106/45 |
| 3,157,522 | 11/1964 | Stookey | 65/33 |
| 3,201,266 | 8/1965 | MacDowell | 65/33 |
| 3,246,972 | 4/1966 | Smith | 65/18 |
| 3,546,061 | 12/1970 | Kraemer et al. | 65/144 X |

Primary Examiner—S. Leon Bashore
Assistant Examiner—Kenneth M. Schor
Attorney, Agent, or Firm—Toren, McGeady and Stanger

[57] ABSTRACT

In the disclosed method of manufacturing glass objects by molding and sintering glass powder, a layer of colloidal silica is applied onto the surface of the glass particles of the powder prior to molding and sintering.

25 Claims, 1 Drawing Figure

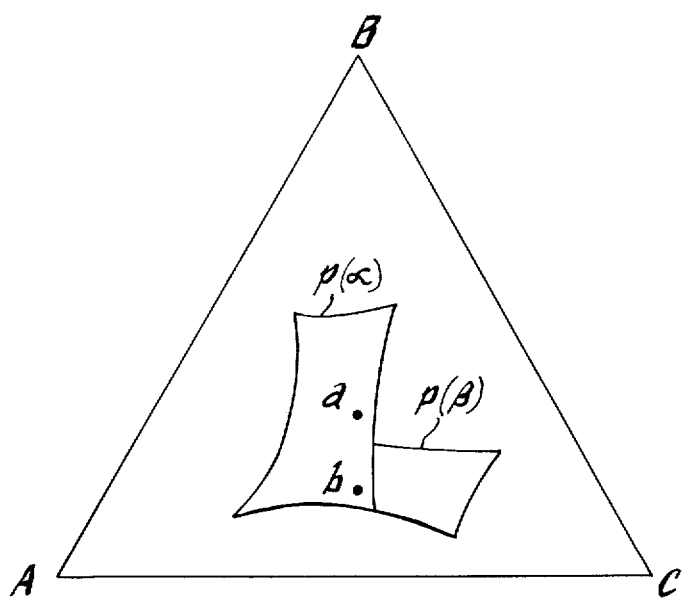

METHOD OF MANUFACTURING A GLASS OBJECT BY MOLDING AND SINTERING GLASS POWDER

FIELD OF INVENTION

The invention is directed to methods of manufacturing glass objects or articles by molding and sintering glass powder.

SUMMARY OF INVENTION

The primary object of the present invention is to provide a method by means of which glass powder can be successfully sintered at low temperature and under relatively low pressure to form glass objects or articles exhibiting low porosity.

A particular object of the present invention is to provide such a method which renders it possible to sinter the glass powder in a simple way and in such a manner that the finished glass object acquires a cristalline structure, to wit, the structure of so-called ceramic glass.

The inventive method makes it possible to produce glass objects and articles for both household and industrial use and also for decorative purposes.

Briefly and in accordance with the invention, a layer of colloidal silica is applied onto the surface of the glass particles of the glass powder, and the glass powder thus obtained is subsequently molded and sintered in conventional manner, to wit, by methods well known in the art. The crux of the invention is thus the application of the colloidal silica layer prior to the molding and sintering.

The colloidal silica has a tendency to make the glass surface of the particles more reactive, thus facilitating the subsequent sintering procedure.

The colloidal silica is suitably applied in a quantity of 0.01 - 0.1 gram silica per $m^2$ of glass surface.

The glass powder used for the purposes of the present invention has advantageously a particle size of 0.5 - 50 $\mu$m.

According to the present invention, the colloidal silica may be applied onto the glass surface of the particles in various ways. According to one method, the glass powder is first moistened with a previously prepared colloidal solution of silica, whereupon the glass powder is dried and, after drying, is ready for molding and sintering. A colloidal silica solution which is superiorly suitable for the inventive purposes, is that manufactured and marketed by Du Pont under the trade name Ludox.

According to a different embodiment, the glass powder is first placed in an alkaline silicate solution which suitably has a concentration of 0.1 - 1N, whereupon the system thus obtained is acidified suitably to a pH value of about 2. The acidification results in the precipitation of colloidal silica which deposits on the surfaces of the glass particles. Excess solution is then poured off and the glass powder is dried.

In further developing the present invention, it has been found to be advantageous to etch the surface of the glass particles prior to the coating or application with the colloidal silica. The etching both cleans the surface of the glass and also makes it smoother. This is advantageous not only for the subsequent sintering but also for the crystallization if ceramic glass is to be manufactured. The etching can be carried out by, for example, treating the glass powder with an aqueous solution of hydrogen fluoride. In the alternative, the glass surface of the particles can be etched by treating the glass powder with an aqueous solution of an alkaline substance, such as, for example, sodium hydroxide which is preferred for this purpose. The latter method has the advantage that it can be combined with the process of coating the surface of the glass particles with colloidal silica. This is so because as a result of the etching, a small quantity of glass is actually dissolved by the alkaline solution in the form of silicate. Upon acidification of the solution, colloidal silica is then precipitated and deposits on the surface of the glass particles, thereby accomplishing the intended coating.

A rather mild etching process is sufficient to produce the desired effect. Tests have indicated that when etching is effected with a water solution of sodium hydroxide having a pH value slightly above 10 and a temperature of about 20°C, sufficient etching is obtained after about 5 minutes. If the temperature is increased to about 50°C, the etching period can be considerably reduced and tests have shown that an etching period of 0.5 minutes is sufficient for the intended purpose. After the etching, the solution is acidified, preferably with hydrochloric acid, so as to obtain a pH value of about 2. This acidification to the indicated pH value results in the desired precipitation of colloidal silica and its deposit on the glass particles.

As previously stated, the coating of the glass powder particles with colloidal silica facilitates the sintering of the glass. However, considered from another aspect, the coating makes the crystallization of the glass more difficult, particularly if the glass particles have been etched prior to the coating with silica. Although applicant does not want to be limited by any theories advanced by him, it is believed that the reason for the impeded crystallization is that the etching procedure and the subsequent coating with silica, eliminates or inactivates the small quantity of impurities which are normally present on the surface of glass particles and which have a tendency to initiate or promote the formation of crystal seeds about which the glass crystals are formed and grow. Accordingly, and for the purpose of eliminating these disadvantages and if a glass coated with colloidal silica is to be used for the manufacture of ceramic glass — sometimes referred to in the art as glass-ceram — it is advantageous, according to one embodiment of the present invention, to add a substance which acts as a crystal seeding material during the sintering process. This substance thus makes up for the loss of impurities which have been removed or inactivated as a result of the etching and/or coating procedure. It has been established that the controlled addition of seeding material produces a crystal formation which is superior to that obtained by the mere presence of impurities on the glass surface. By suitably selecting the quantity and nature of the crystal seeding material and by suitably controlling the temperature during the sintering and cooling processes, it is possible to achieve rapid production of crystallized glass products with a well controlled and superior crystal structure.

Accordingly, and considering this aspect of the inventive method, the invention proposes that a small quantity of finely ground powder of crystallized glass of the desired crystal type is added to glass powder of the desired composition. The crystallized glass powder then acts as the desired seeding agent and a rapid growth of the crystals of the added crystalline powder is obtained during the sintering throughout the entire mass of the glass powder. Since the glass powder during the sintering and molding procedure is enclosed in a mold, it is possible to maintain the temperature at a value at which the growth rate of the crystals is the greatest. In conventional crystallization processes, it is not feasible to raise the temperature to a value at which maximum growth rate of the crystals is obtained before practically the entire volume of powder has already crystallized. This is so because the glass phase at this temperature is extremely liquid and thus causes deformation of the product. However, according to the inventive procedure as proposed hereinabove, this drop in viscosity is in fact exploited since in this manner the powder becomes more compacted or packed.

Glass, including ceramic glass of different compositions may be manufactured pursuant to the inventive method. Thus, for example, it is possible to manufacture ceramic glass having the following composition: 30–80% $SiO_2$, 1–20% $Al_2O_3$, 0–10% MgO, 0–10% CaO, and possibly small quantities of ZnO, BeO, $K_2O$ and BaO.

When selecting the crystal seeding material, the general rule is that this material should have a structure corresponding to the structure of the primary or secondary crystalline phase in the phase system for the glass composition in question. Commercially available substances may oftentimes be used as crystal seed material. Examples of such substances are titanium dioxide ($TiO_2$), devitrite, (which is a sodium silicate having the formula $Na_2O \cdot 3CaO \cdot 6SiO_2$) and cordierite, which is a magnesium-aluminum silicate having the formula 2 $MgO \cdot 2 Al_2O_3 \cdot 5 SiO_2$. However, if a crystal seed material having the desired crystal structure is unobtainable commercially, the seed material can be easily manufactured on the premises of the glass producing plant. Thus, a glass having the desired composition is manufactured and is then heat-treated at such a temperature that crystal seeds are spontaneously formed and crystals of the desired structure grow. When the glass is cooled, it is then crushed and ground to the desired particle size. Such a method of manufacturing crystallized glass is well known in the art and is, for example, described in U.S. Pat. No. 3,157,522. While, of course, this method is somewhat time consuming, it should be appreciated that even a small quantity of seed material manufactured in this manner can subsequently be used to produce a very large quantity of crystallized glass according to the invention. When continuous production has been achieved, it is possible in certain cases to return or recycle a part of the manufactured material to the sintering process in finely ground form, whereupon this recycled material acts as crystal seed material.

The choice of suitable crystal-seed material will be illustrated with the help of the ternary diagram shown in the accompanying drawing. The diagram is a fictitious phase diagram representing a three-component system A, B, C where, for the sake of simplicity, the molecular weight is assumed to be of equal value for all three components. Point $a$ in the diagram represents a crystal phase having the composition A.B.C, here called $\alpha$. Point $b$ represents a crystal phase having the composition 2A.B.2C, here called $\beta$. The primary crystallization area for phase $\alpha$ is designated $p(\alpha)$ in the diagram and the primary crystallization area for phase $\beta$ is designated $p(\beta)$.

As is seen, point $a$ lies within its primary crystallization area $p(\alpha)$. This means that when manufacturing crystallized glass of composition $a$, a glass of the desired composition may be allowed to crystallized in known manner. Due to the thermodynamic circumstances complete crystallization of phase $\alpha$ is possible. When manufacturing in accordance with the invention, a crystal-seed material is added which has the composition $a$ or which is at least of $\alpha$ type, i.e., has a composition which lies in the region $p(\alpha)$. A complete, or substantially complete crystallization of phase $\alpha$ is thus obtained more rapidly and in a more controlled manner than with spontaneous crystallization.

However, as can be seen, point $b$ lies outside its own primary crystallization area $p(\beta)$. This means that with conventional techniques for crystallization of glass which, when finished, should have the composition $b$, a glass cannot be used as starting material which has the composition $b$. Instead, a glass composition in the region $p(\beta)$ must be used and a seeding material, such as $TiO_2$ must be added. This means that it is not possible to achieve complete formation of crystals having the composition $b$ and a choice must be made between retaining remains of glass between the crystal grains of crystallizing out one, or often two, other crystal phases from the remaining glass. Usually these phases do not have nearly such satisfactory qualities as the $\beta$ phase and, like the remaining glass, deteriorate the final result. However, when manufacturing in accordance with the invention, a glass powder having the composition $b$ may be used to start with. A small quantity of seed material of $\beta$ type is added, that is, having the composition $b$. An almost complete crystallization of $\beta$ phase is thus possible with the composition $b$.

An example of a crystal phase which ends up outside its primary crystallization area is cordierite, $2MgO.2Al_2O_3.5SiO_2$, and this must therefore be manufactured as described above for ceramic glass of $\beta$ type. By adding cordierite crystals to glass having cordierite composition, it is then possible to obtain a material with 100% crystalline phase. This is impossible with material manufactured in conventional manner where at least 10% $TiO_2$ crystals plus mullite crystals and glass remnants are obtained.

When manufacturing ceramic glass according to the invention, the crystal-seed material is suitably added in a quantity of 0.5–10% calculated on the weight of the glass. The more seed material added, the quicker will be the crystallization in general. The crystal-seed material preferably has a particle size which is considerably smaller than the particle size of the glass powder, preferably 1/10 – 1/100 of the particle size of the glass powder. The seed material should be mixed extremely well with the glass powder so that it is distributed evenly on the surface of the glass particles. Thorough mixing is facilitated if the glass powder is moist. The mixing should therefore take place after the glass powder particles have been coated with a layer of colloidal silica, but before the glass powder is dried. When the seed material has been thoroughly mixed in, the powdered glass is dried, preferably by heating it to 100°–200°C. The dried powder is then inserted in a metal mold, preferably in the form of a press die, so that the powder can be kept under pressure during the sintering, which speeds up the sintering and reduces the porosity. A suitable pressure is 0.05–1 kp/mm². The press die is heated to the desired sintering temperature, usually within the range of 500°–1,000°C. When the glass has sintered and crystallized, the press die is cooled, the pressure released and the finished glass object is taken out of the die. The object is preferably removed from the die at a temperature of 400°–500°C and then allowed to cool in a cooling oven.

EXAMPLE

A glass with a composition of 14% MgO, 35% $Al_2O_3$ and 51% $SiO_2$ is melted and cooled quickly in water. The glass is crushed and ground until 80% has a grain size between 0.5 and 2 $\mu$m. The glass powder is leached for 5 minutes in 0.1-N NaOH having a temperature of 20°C. Enough HCl is then added to the solution to impart it with a pH value of 2. While the glass powder is still in the solution, 10% cordierite crystals are added, calculated on the weight of the glass powder, 90% of the crystals having a particle size of less than 0.05 mm. The crystals are mixed with the glass powder by stirring. The liquid phase is then decanted off. The powder mixture is dried at a temperature of between 100° and 200°C and then inserted in a press die. The pressure in the press die is increased to 0.1 kp/mm$^2$ and the temperature is increased to 945°C. The holding time is 10 minutes, after which the temperature is lowered to 500°C at the same time as the pressure is gradually released. At 500°C the product is removed from the mold and allowed to cool in a cooling kiln. The finished product is a ceramic glass having a porosity of 1–2%.

What is claimed is:

1. In a method of manufacturing a glass object, wherein glass powder is molded and sintered, the improvement which comprises that, prior to the molding and sintering, the glass powder particles are coated with colloidal silica, said coating being effected by placing the glass powder in an alkaline silicate solution, thereupon acidifying the solution to a pH value at which colloidal silica precipitates, whereby said colloidal silica deposits on the surfaces of the glass particles, to coat the latter, and finally drying the coated glass powder.

2. The improvement of claim 1, wherein the quantity of colloidal silica which is coated onto the glass powder particles is 0.01 to 0.1 gram per m$^2$ of glass surfaces.

3. The improvement of claim 1, wherein said glass powder particles have a particle size of about 0.5 to 50 $\mu$m.

4. The improvement as claimed in claim 1, wherein said alkaline silicate solution has a concentration of about 0.1 to 1N.

5. The improvement of claim 1, for the manufacture of an object of crystallized glass, wherein a quantity of crystal seed material is mixed with the glass powder, said seed material being in the form of a powderous crystalline material having a crystal structure corresponding to the structure of the primary or secondary crystalline phase in the phase system of the glass in question.

6. The improvement of claim 5, wherein said crystal seed material is mixed with said glass powder in an amount of 0.5 to 10% calculated on the weight of the glass powder.

7. The improvement of claim 5, wherein said crystal seed material has a particle size which is smaller than the particle size of the glass powder.

8. The improvement of claim 7, wherein the particle size of the crystal seed material is about 1/10 to 1/100 of the particle size of the glass powder.

9. In a method of manufacturing a glass object, wherein glass powder is molded and sintered, the improvement which comprises that, prior to the molding and sintering, the surfaces of the powder particles are etched, whereupon the glass powder particles are coated with colloidal silica.

10. The improvement of claim 9, wherein said colloidal silica is coated onto the glass particles, by moistening the glass particles with a colloidal solution of silica, whereupon the glass powder is dried.

11. The improvement of claim 8, wherein the quantity of colloidal silica which is coated onto the glass particles is 0.01 to 0.1 grams per m$^2$ of glass surfaces.

12. The improvement of claim 9, wherein said glass powder particles have a particle size of about 0.5 to 50 $\mu$m.

13. The improvement of claim 9, wherein the etching is performed by treating the glass powder with an aqueous solution of hydrogen fluoride.

14. The improvement of claim 9, wherein the etching is performed by treating the glass powder with an alkaline aqueous solution.

15. The improvement of claim 14, wherein said alkaline aqueous solution is an aqueous sodium hydroxide solution.

16. The improvement of claim 9 for the manufacture of an object of crystallized glass, wherein a quantity of crystal seed material is mixed with the glass powder, said seed material being in the form of a powderous crystalline material having a crystal structure corresponding to the structure of the primary or secondary crystalline phase in the phase system of the glass in question.

17. The improvement of claim 16, wherein said crystal seed material is mixed with said glass powder in an amount of 0.5 to 10% calculated on the weight of the glass powder.

18. The improvement of claim 16, wherein said crystal seed material has a particle size which is smaller than the particle size of the glass powder.

19. The improvement of claim 18, wherein the particle size of the crystal seed material is about 1/10 to 1/100 of the particle size of the glass powder.

20. In a method of manufacturing a glass object, wherein glass powder is molded and sintered, the improvement which comprises that, prior to the molding and sintering, the surfaces of the glass powder particles are etched by treating the glass powder with an aqueous alkaline solution, whereby a quantity of glass is dissolved by the solution in the form of silicate, and acidifying the solution, whereupon said silicate deposits on the surfaces of the glass particles in the form of a colloidal silica coating.

21. The improvement of claim 20, wherein said glass powder particles have a particle size of about 0.5 to 50 $\mu$m.

22. The improvement of claim 20 for the manufacture of an object of crystallized glass, wherein a quantity of crystal seed material is mixed with the glass powder, said seed material being in the form of a powderous crystalline material having a crystal structure corresponding to the structure of the primary or secondary crystalline phase in the phase system of the glass in question.

23. The improvement of claim 22, wherein said crystal seed material is mixed with said glass powder in an amount of 0.5 to 10% calculated on the weight of the glass powder.

24. The improvement of claim 22, wherein said crystal seed material has a particle size which is smaller than the particle size of the glass powder.

25. The improvement of claim 24, wherein the particle size of the crystal seed material is about 1/10 to 1/100 of the particle size of the glass powder.

* * * * *